United States Patent Office 2,986,550
Patented May 30, 1961

2,986,550
POLYNUCLEAR EPOXIDE RESIN

Anthony Charles Davis, Solihull, Birmingham, and Robert Fergus Hunter, Olton, Birmingham, England, assignors to Bakelite Limited, London, England, a British company No Drawing. Filed May 18, 1956, Ser. No. 585,628

8 Claims. (Cl. 260—47)

This invention is for improvements in or relating to epoxide resins and has particular reference to a new type of epoxide resin, the molecule of which contains a chain consisting of at least three phenylene groups linked by methylene groups.

It is known to prepare epoxide resins by reacting dihydric phenols with epichlorhydrin in the presence of a condensing agent, e.g. caustic soda. The dihydric phenols which may be used in the preparation of such epoxide resins may have phenolic hydroxyl groups attached either to the same benzene nucleus or to different benzene nuclei. The present invention is concerned with the preparation of epoxide resins from dihydric phenols in which the phenolic hydroxyl groups are attached to different benzene nuclei. Hitherto this specific type of dihydric phenol used to prepare epoxide resins has had the general formula:

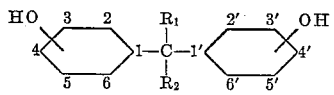

in which the hydroxyl groups may be in the 2,2'; 2,3'; 2,4'; 3,3'; 3,4'; 4,4' positions on the aromatic rings which may bear other substituents and in which $R_1$ and $R_2$ separately may be hydrogen, lower alkyl, cycloalkyl, or substituted alkyl, phenyl, or substituted phenyl groups and in which $R_1$ and $R_2$ together with the connector carbon may be cyclohexylidene or alkyl cyclohexylidene or phenylene or an alkyl phenylene group.

The most commonly used diphenol is 4,4'-dihydroxy-diphenyl-dimethyl-methane known as bis phenol A and this has the formula:

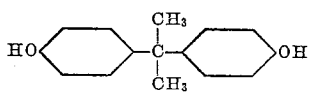

It is possible to react this diphenol with epichlorhydrin to give either a diglycidyl ether in which substantially the only reactive groups are epoxide groups or a diglycidyl either in which there are reactive epoxide and hydroxyl groups.

The low molecular weight diglycidyl ethers having substantially no reactive hydroxyl groups but only epoxide groups, may be formed by reacting a diphenol with a large excess of epichlorhydrin in the presence of a condensing agent, e.g. caustic soda, and the molecule of the resulting resin can be represented by the formula:

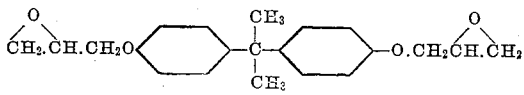

We have now found that epoxide resins having improved flexibility, impact strength and adhesive properties coupled with a retention in cross-breaking strength and a lower volumetric shrinkage on curing, a lower exotherm and a long pot life when mixed with an amine hardener, can be made by reacting an excess of, e.g. epichlorhydrin, with polynuclear diphenols, which polynuclear diphenols contain at least three phenylene groups in a chain joined to one another by methylene groups and in which the phenolic hydroxyl groups are attached one on each terminal phenylene group.

According to the present invention there is provided a method for making an epoxide resin, which method consists of reacting with epichlorhydrin or a-dichlorhydrin a dihydric phenol containing at least three phenylene groups in a chain joined together by methylene groups in which the phenolic hydroxyl groups are attached one to each terminal phenylene group.

The simplest dihydric phenol used in this invention is bis-hydroxy benzyl-benzene, the molecule of which may be represented by the formula:

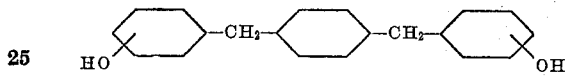

The next one in the series of bis-hydroxybenzyl-diphenyl-methane, the molecule of which may be represented by the formula:

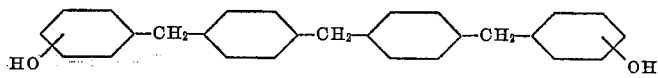

The nomenclature used in the present specification to denote these compounds is based on that used by A. C. Davis, B. T. Hayes, and R. F. Hunter in "Phenol-Formaldehyde and Allied Resins. II. Trinuclear and Hexanuclear Novolaks," Journal of Applied Chemistry, 1953, 3, pages 312–317 and by A. T. Carpenter and R. F. Hunter in "Synthesis of 2:4:6-Trishydroxymethylphenol and of 2:4:6-Trishydroxybenzylphenol Derivatives," Journal of the Chemical Society, August 1954, (5004), pages 2731–2735.

Following is a description by way of example of methods of carrying the invention into effect.

Example 1

A trinuclear phenol was prepared by heating together p-bis-chloromethyl-benzene (58 g.) and phenol (630 g.) at approximately 170° C. for one hour, and then boiling under reflux for 30 minutes. The excess of phenol was largely removed by distillation at reduced pressure and the last traces by distillation in steam. The semi-solid residue was dried by boiling with toluene (500 cc.) under and Dean and Stark still head. The product (60 g.) which crystallized upon cooling was collected by filtration and dried in vacuum. The resulting 1,4-bis-hydroxy-benzyl-benzene was a light brown crystalline powder, M.P. 150 to 156° C. An epoxide resin based on this phenol was then prepared by dissolving bis-hydroxybenzyl-benzene (22 g.) in a mixture of epichlorhydrin (42 g.) and 95 percent alcohol (11 g.). Sodium hydroxide (7.2 g.) in water (7 cc.) was added gradually with continuous stirring during four hours, the temperature being kept at 60° C. The alcohol and the excess of epichlorhydrin were removed by distillation at reduced pressure, and toluene (60 cc.) and water (30 cc.) were stirred into the residue. After separation from the aqueous layer, the toluene solution was concentrated in vacuum to leave the trinuclear resin (30.5 g.) as a viscous brown liquid ($n_D^{18}$ 1.5942) which slowly crystallized to a semi-solid mass during storage. From the molecular weight and epoxide content the molecule of this resin can be represented by the formula:

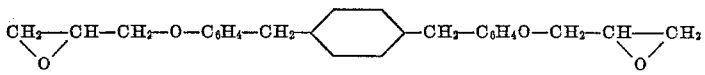

The resin was warmed slightly to reduce its viscosity and 12.7 percent by weight based on the weight of the resin of diethylenetriamine was stirred in until a homogeneous solution was formed. The mixture was poured into open molds and heat-cured for 16 hours at 60 to 65° C. The cured resin had a modulus of 387 kg./sq. mm., an impact strength of 0.407 ft. lb. and a cross breaking strength of 21,200 p.s.i. The corresponding figures for a cured epoxide resin based on diphenylolpropane were 419 kg./sq. mm. 0.229 ft. lb., and 22,700 p.s.i. respectively. Thus, it can be seen that the cured epoxide resin based on 1:4-bis-hydroxy-benzylbenzene had a significantly greater impact strength Both resins were used to bond aluminum to aluminum and, after curing the resinous bonds for 30 mins. at 115° C., the bond strength of the epoxide resin based on 1,4-bis-hydroxybenzylbenzene was 3,300 p.s.i. compared with 2,400 p.s.i. for the epoxide resin based on diphenylolpropane.

*Example 2*

A tetranuclear phenol was first prepared by heating together at 100° C. 4,4'-bis-chloromethyl-diphenylmethane (70 g.) and phenol (600 g.) until evolution of hydrogen chloride slackened, and then boiling under reflux for 15 minutes. The excess of phenol was removed by concentration in vacuum followed by distillation in steam. The partially crystalline residue was freed from water by refluxing in toluene (600 cc.) under a Dean and Stark still head, and the solution was allowed to cool and the crystalline product (72 g.) was filtered by suction and dried in vacuum at 55° C. An epoxide resin based on this phenol was then prepared by dissolving 4,4'-bis-hydroxybenzyl-diphenylmethane (41 g.) in a mixture of 95 percent ethanol (20 cc.) and epichlorhydrin (60 g.). The solution was stirred for 4½ hours at 60° C. while a solution of sodium hydroxide (10 g.) in water (10 cc.) was added gradually. The alcohol and excess of epichlorhydrin were removed by distillation at reduced pressure, and toluene (90 cc.) and water (40 cc.) were stirred into the residue. After separation from the aqueous layer, the toluene solution was concentrated in vacuum to leave the tetranuclear resin (52 g.) as a viscous brown oil ($n_D^{18}$ 1.6082) which gradually crystallized to an almost solid mass. From the molecular weight and epoxide content, the molecule of this resin can be represented by the formula:

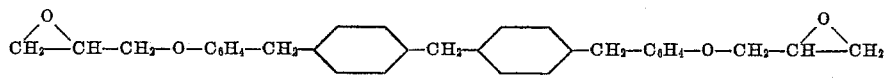

The resin was warmed slightly to reduce the viscosity and 9.9 percent by weight based on the weight of the resin of diethylenetriamine was stirred in until a homogeneous solution was formed. The mixture was poured into open molds and cured for 16 hours at 60 to 65° C. The modulus of the cured resin was 357 kg./sq. mm. while the impact strength was 0.310 ft. lb., and the cross breaking strength 21,600 p.s.i. compared with 419 kg./sq. mm., 0.229 ft. lb., and 22,700 p.s.i. respectively for a cured epoxide resin based on diphenylolpropane. Here again an epoxide resin of this invention, viz. that based on 4:4'-bis-hydroxybenzyldiphenylmethane had a significantly higher impact strength than the resin based on diphenylolpropane.

What we claim is:

1. Diglycidyl ether of bis-hydroxybenzylbenzene having the formula:

2. Diglycidyl ether of 4,4'-bis-hydroxybenzyl-diphenylmethane having the formula:

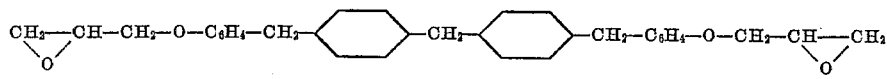

3. A polyglycidyl ether of a dihydric phenol, said dihydric phenol containing from three to four phenylene groups in a chain joined to one another by single methylene groups and in which the phenolic hydroxy groups are attached one on each terminal phenylene group.

4. The heat-cured product of claim 3, said product having an impact strength of at least 0.3 ft. lb.

5. A method for producing a polyglycidyl ether which comprises reacting at a temperature up to about 60° C. a mixture containing a dihydric phenol containing from three to four phenylene groups in a chain joined to one another by single methylene groups in which the phenolic hydroxyl groups are attached one to each terminal phenylene group, a compound selected from the group consisting of epichlorohydrin and a-dichlorohydrin, said compound being present in an amount sufficient to replace substantially all of the hydroxyl groups of the said dihydric phenol with glycidyl groups, and an alkali metal compound.

6. A method as defined in claim 5 wherein the alkali metal compound is sodium hydroxide.

7. Method as defined in claim 5 wherein the dihydric phenol is bis-hydroxybenzylbenzene.

8. Method as defined in claim 5 wherein the dihydric phenol is bis-hydroxybenzyl diphenylmethane.

(References on following page)

References Cited in the file of this patent

UNITED STATES PATENTS

| | | | |
|---|---|---|---|
| 2,076,624 | De Groote | Apr. 13, | 1937 |
| 2,142,007 | Schlack | Dec. 27, | 1938 |
| 2,543,489 | De Groote et al. | Feb. 27, | 1951 |
| 2,581,367 | De Groote et al. | Jan. 8, | 1952 |
| 2,658,885 | D'Alelio | Nov. 10, | 1953 |
| 2,714,098 | Martin | July 26, | 1955 |
| 2,716,099 | Bradley et al. | Aug. 23, | 1955 |
| 2,811,564 | Bader | Oct. 29, | 1957 |

FOREIGN PATENTS

| | | | |
|---|---|---|---|
| 1,106,304 | France | July 20, | 1955 |

OTHER REFERENCES

Carswell: "Phenolplasts," Interscience Publishers, Inc., New York, N.Y. (1947).